US012621489B2

(12) United States Patent

Peringassery Krishnan et al.

(10) Patent No.: US 12,621,489 B2

(45) Date of Patent: May 5, 2026

(54) SYSTEMS AND METHODS FOR APPLYING NON-SEPARABLE TRANSFORMS ON INTER PREDICTION RESIDUALS

(71) Applicant: Tencent America LLC, Palo Alto, CA (US)

(72) Inventors: Madhu Peringassery Krishnan, Palo Alto, CA (US); Yushin Cho, Palo Alto, CA (US); Xin Zhao, Palo Alto, CA (US); Liang Zhao, Palo Alto, CA (US); Jing Ye, Palo Alto, CA (US); Han Gao, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 20 days.

(21) Appl. No.: 18/677,733

(22) Filed: May 29, 2024

(65) Prior Publication Data

US 2025/0175644 A1    May 29, 2025

Related U.S. Application Data

(60) Provisional application No. 63/603,544, filed on Nov. 28, 2023.

(51) Int. Cl.
H04N 19/60 (2014.01)
H04N 19/159 (2014.01)
(Continued)

(52) U.S. Cl.
CPC ........... H04N 19/60 (2014.11); H04N 19/159 (2014.11); H04N 19/176 (2014.11); H04N 19/18 (2014.11)

(58) Field of Classification Search
CPC .... H04N 19/60; H04N 19/159; H04N 19/176; H04N 19/18; H04N 19/11; H04N 19/12; H04N 19/157; H04N 19/70
See application file for complete search history.

(56) References Cited

U.S. PATENT DOCUMENTS 11,711,533 B2 * 7/2023 Kim ..................... H04N 19/119
                                                    375/240.25
11,949,866 B2 * 4/2024 Liu ...................... H04N 19/196
                          (Continued)

FOREIGN PATENT DOCUMENTS

JP          2025525513 A  *  8/2025  ............. H04N 19/70
WO     WO 2017193997 A1   11/2017

OTHER PUBLICATIONS

Tencent Technology, ISR/WO, PCT/US2022/032074, Sep. 6, 2022, 8 pgs.

(Continued)

*Primary Examiner* — Dramos Kalapodas

(74) *Attorney, Agent, or Firm* — Morgan, Lewis & Bockius LLP

(57) ABSTRACT

The various implementations described herein include methods and systems for coding video. In one aspect, a method includes receiving a video bitstream that includes a set of inter mode encoded blocks and a corresponding set of transform coefficients. The method includes deriving a set of inter mode residual blocks from the set of transform coefficients. The method includes determining, according to a value of a first indicator in the video bitstream, whether one or more non-separable transform kernels are to be applied to the set of inter mode residual blocks. The method includes applying a first non-separable transform kernel when the indicator has a first value, and forgoing applying the first non-separable transform kernels when the indicator has a second value. The method also includes reconstructing a set of video blocks using the set of inter mode residual blocks and a corresponding set of prediction blocks.

20 Claims, 8 Drawing Sheets

(51) Int. Cl.
    *H04N 19/176*     (2014.01)
    *H04N 19/18*     (2014.01)

(56)         References Cited

U.S. PATENT DOCUMENTS

| | | | |
|---|---|---|---|
| 12,126,833 B2* | 10/2024 | Koo | H04N 19/70 |
| 2017/0272748 A1* | 9/2017 | Seregin | H04N 19/159 |
| 2018/0152402 A1 | 5/2018 | Tsou | |
| 2019/0281290 A1* | 9/2019 | Lee | H04N 19/159 |
| 2020/0274844 A1 | 8/2020 | Zhao et al. | |
| 2020/0322636 A1* | 10/2020 | Egilmez | H04N 19/61 |
| 2021/0058352 A1 | 2/2021 | Fogu et al. | |
| 2021/0160541 A1* | 5/2021 | Chiang | H04N 19/122 |
| 2022/0329819 A1* | 10/2022 | Kerofsky | H04N 19/136 |
| 2023/0078305 A1* | 3/2023 | Koo | H04N 19/176 |
| | | | 375/240.02 |
| 2023/0086769 A1 | 3/2023 | Liu et al. | |
| 2024/0305788 A1* | 9/2024 | Liu | H04N 19/172 |
| 2024/0314322 A1* | 9/2024 | Koo | H04N 19/176 |

OTHER PUBLICATIONS

Tencent Technology, IPRP, PCT/US2022/032074, Nov. 21, 2023, 7 pgs.
Tencent America LLC, ISR/WO, PCT/US2024/032074, Aug. 27, 2024, 19 pgs.

* cited by examiner

Figure 1:
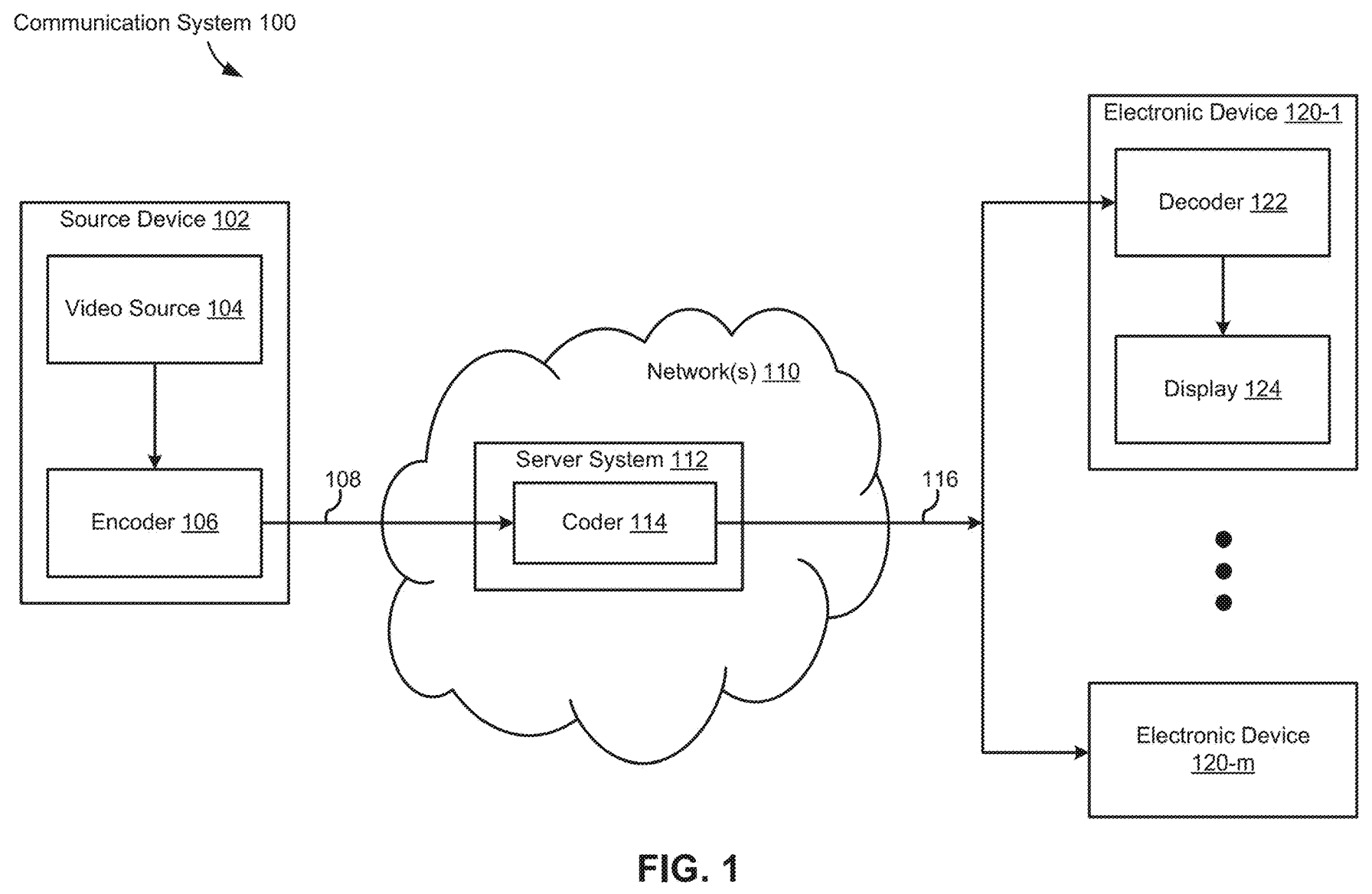

Communication System 100

Source Device 102

Video Source 104

Encoder 106

108

Network(s) 110

Server System 112

Coder 114

116

Electronic Device 120-1

Decoder 122

Display 124

Electronic Device 120-m

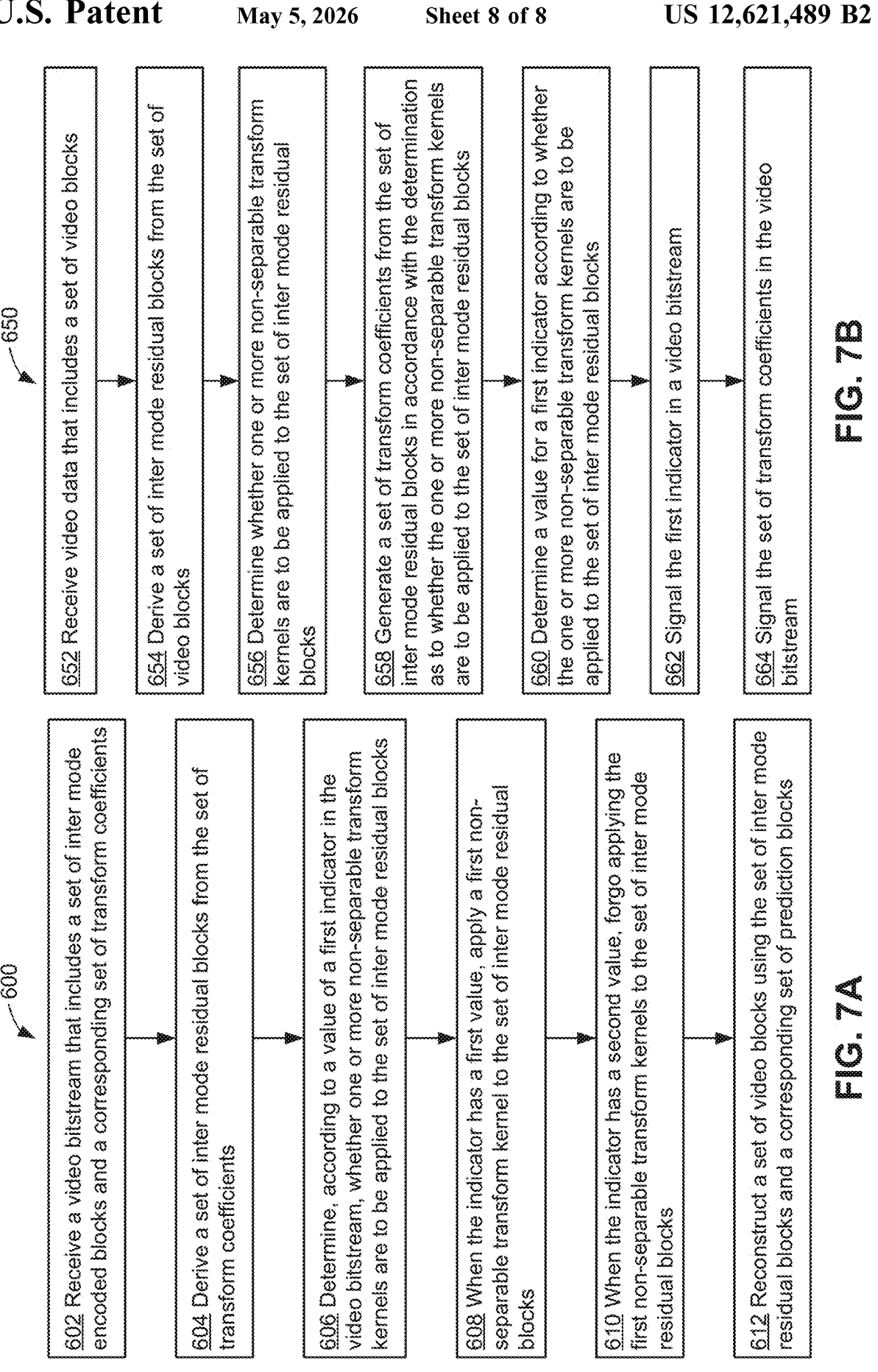

650

652 Receive video data that includes a set of video blocks

654 Derive a set of inter mode residual blocks from the set of video blocks

656 Determine whether one or more non-separable transform kernels are to be applied to the set of inter mode residual blocks 658 Generate a set of transform coefficients from the set of inter mode residual blocks in accordance with the determination as to whether the one or more non-separable transform kernels are to be applied to the set of inter mode residual blocks 660 Determine a value for a first indicator according to whether the one or more non-separable transform kernels are to be applied to the set of inter mode residual blocks 662 Signal the first indicator in a video bitstream 664 Signal the set of transform coefficients in the video bitstream

602 Receive a video bitstream that includes a set of inter mode encoded blocks and a corresponding set of transform coefficients 604 Derive a set of inter mode residual blocks from the set of transform coefficients 606 Determine, according to a value of a first indicator in the video bitstream, whether one or more non-separable transform kernels are to be applied to the set of inter mode residual blocks 608 When the indicator has a first value, apply a first non-separable transform kernel to the set of inter mode residual blocks 610 When the indicator has a second value, forgo applying the first non-separable transform kernels to the set of inter mode residual blocks 612 Reconstruct a set of video blocks using the set of inter mode residual blocks and a corresponding set of prediction blocks

FIG. 7A

SYSTEMS AND METHODS FOR APPLYING NON-SEPARABLE TRANSFORMS ON INTER PREDICTION RESIDUALS

RELATED APPLICATIONS

This application claims priority to U.S. Provisional Patent Application No. 63/603,544, entitled "Methods and Apparatus for Applying Non-Separable Transforms on Inter Prediction Residuals," filed Nov. 28, 2023, which is hereby incorporated by reference in its entirety.

TECHNICAL FIELD

The disclosed embodiments relate generally to video coding, including but not limited to transform coding applied to prediction residuals.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes a set of methods for video (image) compression, including methods for applying non-separable transforms on inter mode block residuals. In accordance with some embodiments, a video bitstream includes a set of inter mode encoded blocks and a corresponding set of transform coefficients. A set of inter mode residual blocks may be derived from the set of transform coefficients. A value of a flag signaled in the video bitstream may indicate whether one or more non-separable transform kernels are to be applied to the set of inter mode residual blocks. Depending on the value of the flag, a first non-separable transform kernel may, or may not, be applied to the set of inter mode residual blocks. A set of video blocks can be reconstructed from the set of inter mode residual blocks and a corresponding set of prediction blocks. An advantage of using non-separable transform coding techniques in this manner is that the quality (e.g., the accuracy and/or precision) of the corresponding reconstructed (decoded) video may be improved. Further, signalling whether or not to use the non-separable transform kernels can reduce computational costs (e.g., more efficiently encoding and/or decoding of the residuals for a video).

In accordance with some embodiments, a method of video decoding includes (i) receiving a video bitstream that includes a set of inter mode encoded blocks and a corresponding set of transform coefficients; (ii) deriving a set (one or more) of inter mode residual blocks from the set of transform coefficients; (iii) determining, according to a value of a first indicator in the video bitstream, whether one or more non-separable transform kernels are to be applied to the set of inter mode residual blocks; (iv) when the indicator has a first value, applying a first non-separable transform kernel to the set of inter mode residual blocks; (v) when the indicator has a second value, forgoing applying the first non-separable transform kernels to the set of inter mode residual blocks; and (vi) reconstructing a set of video blocks using the set of inter mode residual blocks and a corresponding set of prediction blocks.

In accordance with some embodiments, a method of video encoding includes (i) receiving video data that includes a set of video blocks; (ii) deriving a set of inter mode residual blocks from the set of video blocks; (iii) determining whether one or more non-separable transform kernels are to be applied to the set of inter mode residual blocks; (iv) generating a set of transform coefficients from the set of inter mode residual blocks in accordance with the determination as to whether the one or more non-separable transform kernels are to be applied to the set of inter mode residual blocks; (v) determining a value for a first indicator according to whether the one or more non-separable transform kernels are to be applied to the set of inter mode residual blocks; (vi) signaling the first indicator in a video bitstream; and (vii) signaling the set of transform coefficients in the video bitstream.

In accordance with some embodiments, a method of bitstream conversion includes (i) obtaining a source video sequence comprising a plurality of pictures; and (ii) performing a conversion between the source video sequence and a bitstream of visual media data, where the bitstream comprises: (a) a plurality of encoded blocks corresponding to the plurality of pictures; (b) a set of transform coefficients corresponding to the plurality of encoded blocks; and (c) a first indicator indicating whether one or more non-separable transform kernels are to be applied to a set of inter mode residual blocks corresponding to the set of transform coefficients.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIGS. 4A-4D illustrate example coding tree structures in accordance with some embodiments.

FIG. 7A illustrates an example video decoding process in accordance with some embodiments.

FIG. 7B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
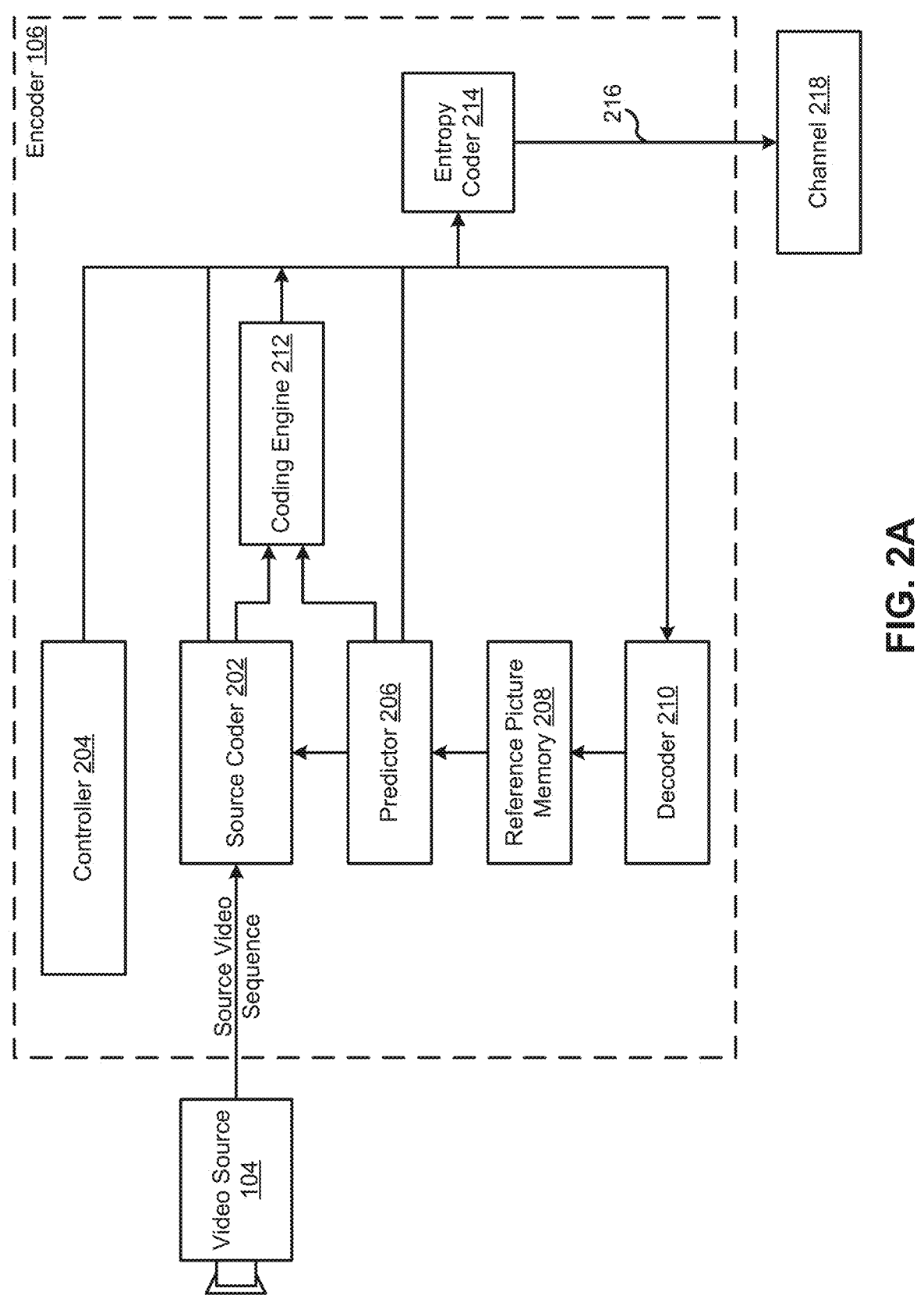
FIG. 2A is a block diagram illustrating example elements of an encoder component in accordance with some embodiments.

The present disclosure describes a set of methods for video (image) compression, including methods for applying transforms on residual blocks. For example, methods for applying non-separable transforms on inter mode block residuals. One or more flags may be received in the coded bitstream, the flag(s) being associated with the application of non-separable transform kernels on inter prediction residual blocks. Applying non-separable transforms on inter mode block residuals can improve the quality of the video encoding/decoding (e.g., improving precision and/or accuracy). Additionally, signaling the application of the non-separable transforms on different blocks can improve coding efficiency (e.g., the decoder does not need to derive which transform to use and can apply the most appropriate transform for the given block).

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and reencode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors.

The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
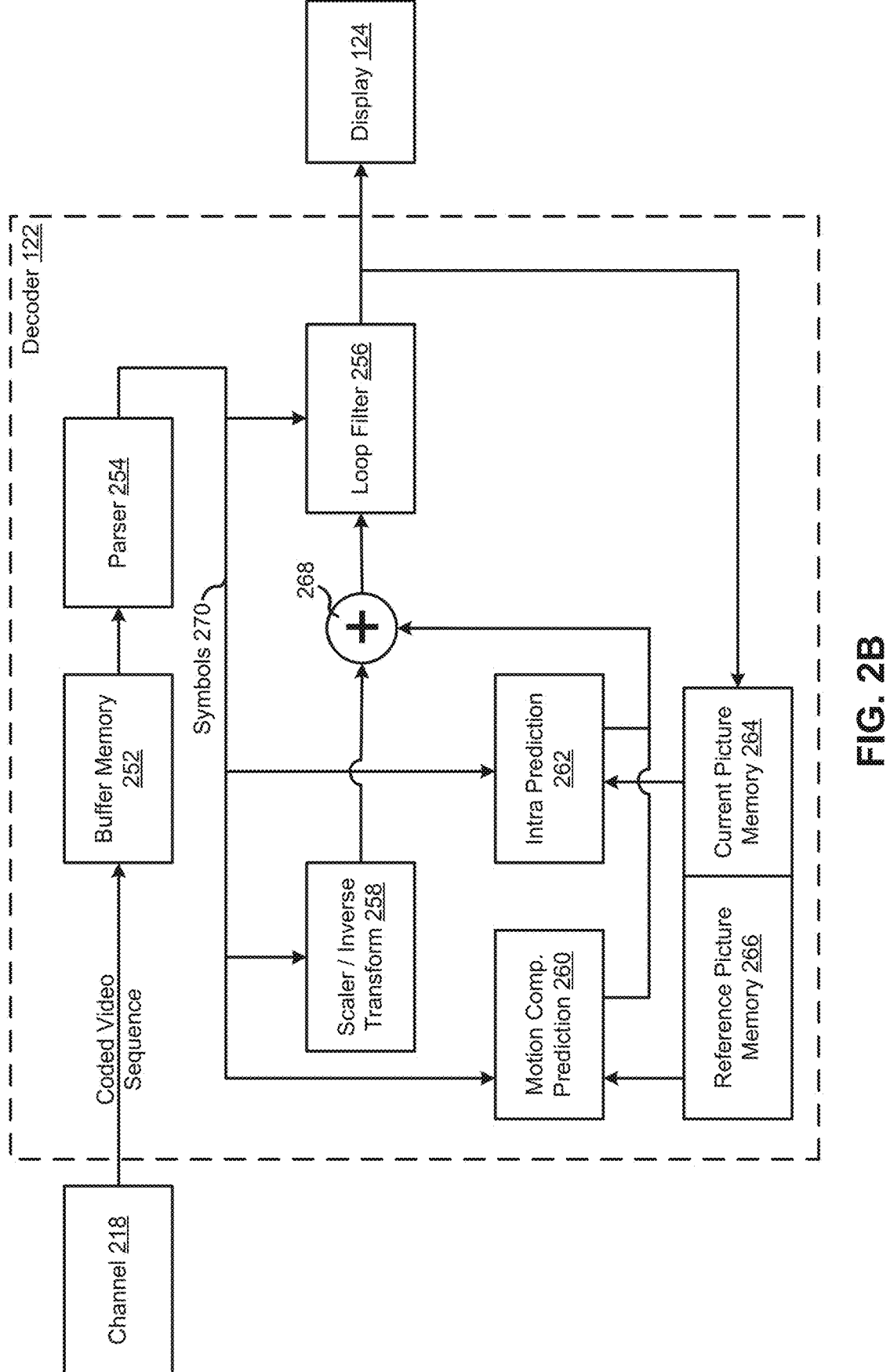
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when subsample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
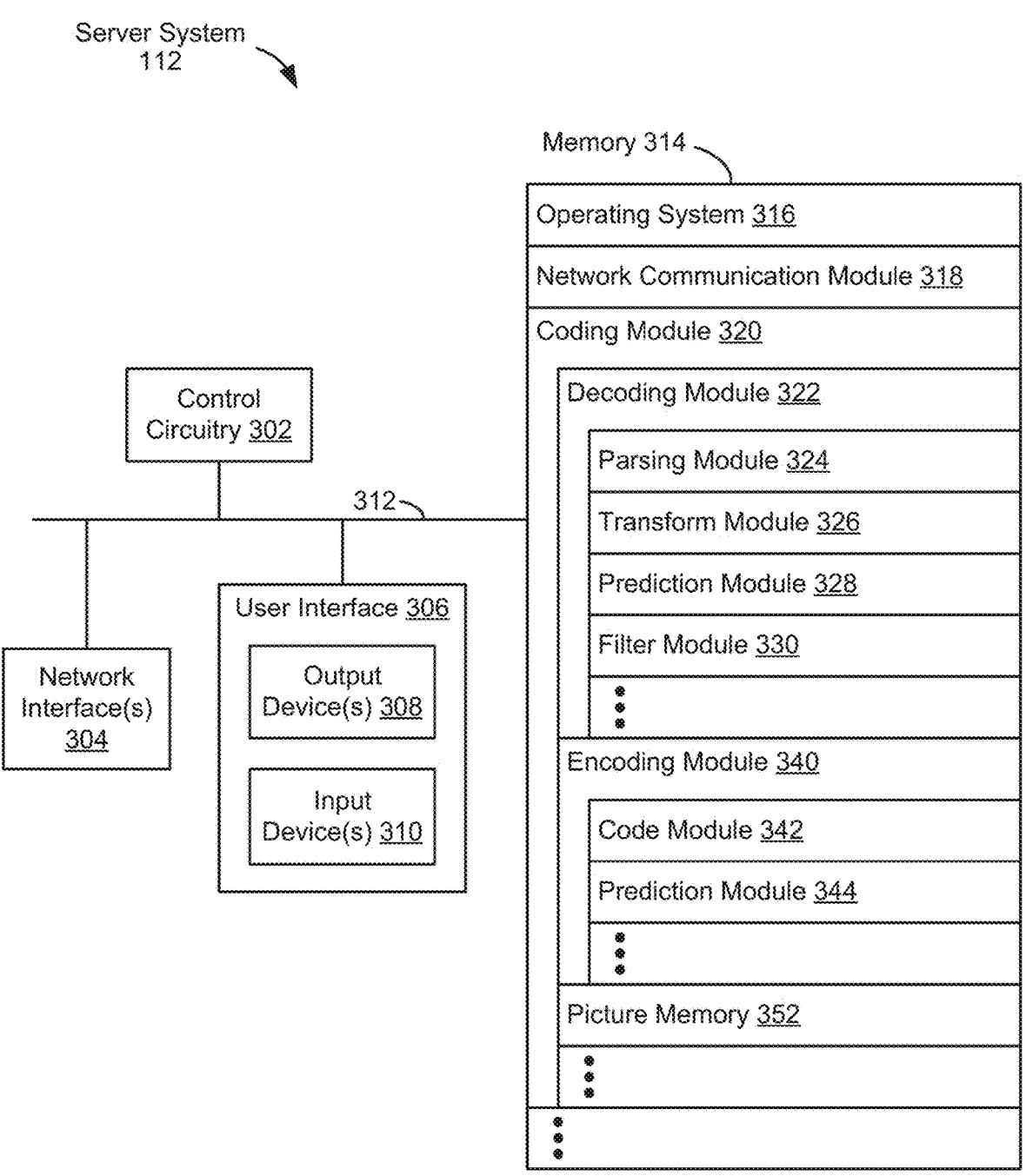
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). According to some embodiments, methods for applying non-separable transform kernels on inter mode residual blocks are described. In the following, a block may refer to a coding tree block, the largest coding block, a pre-defined fixed block size, a coding block, a prediction block, a residual block, or a transform block. An inter mode coded block refers to a block using a inter prediction mode. Additionally, non-separable transforms can refer to primary transforms applied directly to residuals, or secondary transforms applied on the transform coefficient blocks produced by the primary transform. Non-separable transform kernels can be grouped into sets denoted by set indices and kernel indices within a set.

Figures 4A, 4B, 4C, 4D:
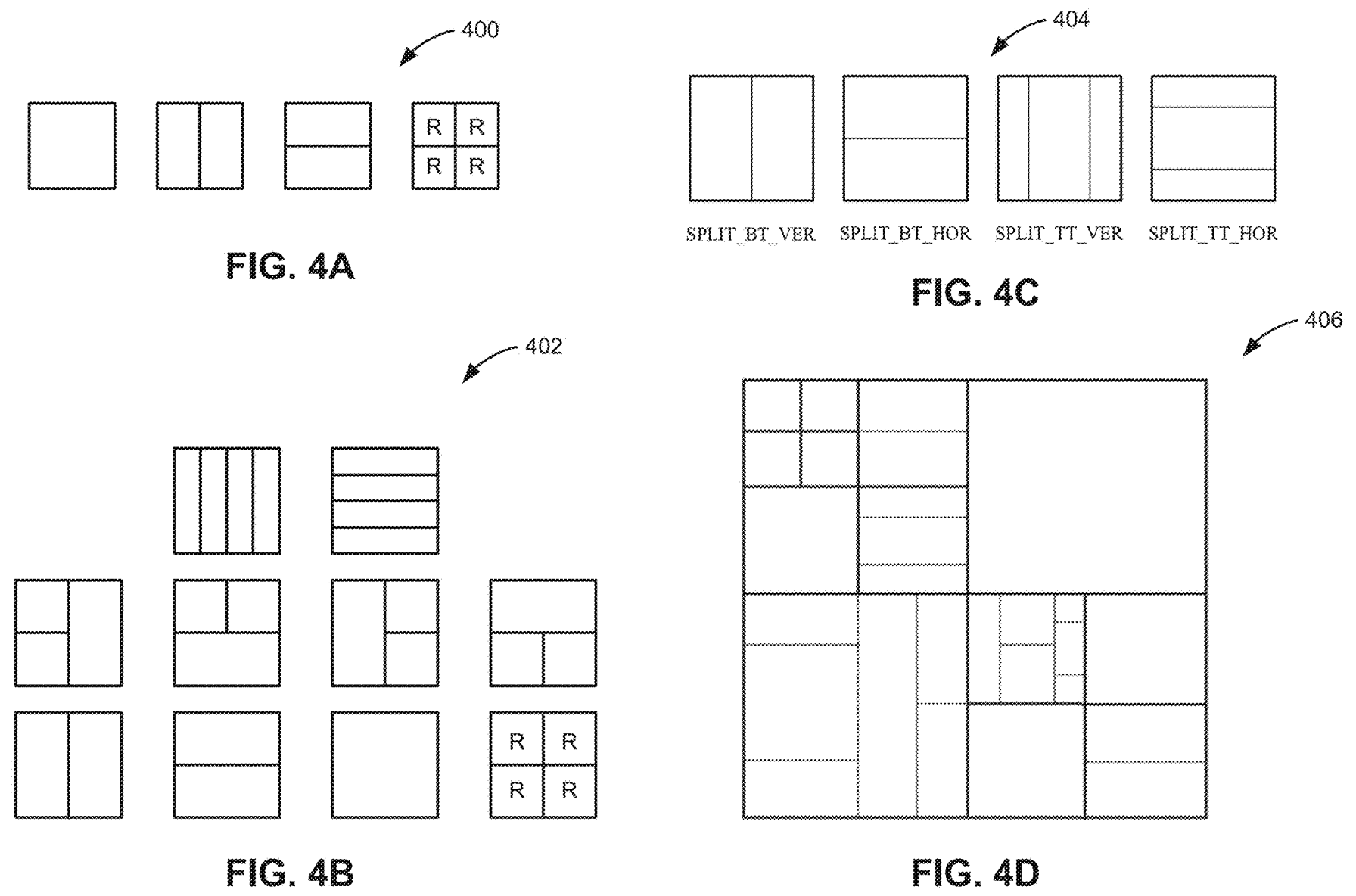

Turning first to block partitioning, FIGS. 4A-4D illustrate example coding tree structures in accordance with some embodiments. As shown in a first coding tree structure (400) in FIG. 4A, some coding approaches use a 4-way partition tree starting from a 64×64 level down to a 4×4 level, e.g., with some additional restrictions for blocks 8×8. In FIG. 4A, partitions designated as "R" are recursive in that the same partition tree is repeated at a lower scale until the lowest level is reached. As shown in the example coding tree structure (402) in FIG. 4B, some coding approaches expand the partition tree to a 10-way structure and increase the largest size (e.g., sometimes referred to as a superblock) to start from 128×128. The second coding tree structure includes 4:1/1:4 rectangular partitions that are not in the first coding tree structure. The partition types with 3 sub-partitions in the second row of FIG. 4B are referred to as T-type partitions. In addition to a coding block size, coding tree depth can be defined to indicate the splitting depth from the root note.

As an example, a coding tree unit (CTU) may be split into coding units (CUs) by using a quad-tree structure denoted as a coding tree to adapt to various local characteristics. In some embodiments, the decision on whether to code a picture area using inter-picture (temporal) or intra-picture (spatial) prediction is made at the CU level. Each CU can be further split into one, two, or four prediction units (PUs) according to the PU splitting type. Inside a PU, the same prediction process is applied, and the relevant information may be transmitted to the decoder on a PU basis. After obtaining the residual block by applying the prediction process based on the PU splitting type, a CU can be partitioned into transform units (TUs) according to another quad-tree structure like the coding tree for the CU.

A quad-tree with nested multi-type tree using binary and ternary splits segmentation structure may be used to replace the concepts of multiple partition unit types. In the coding tree structure, a CU can have either a square or rectangular shape. A CTU is first partitioned by a quaternary tree structure. The quaternary tree leaf nodes can be further partitioned by a multi-type tree structure. As shown in a third coding tree structure (404) in FIG. 4C, the multi-type tree structure includes four splitting types. The multi-type tree leaf nodes are called CUs, and unless the CU is too large for the maximum transform length. This means that, the CU, PU, and TU may have the same block size in the quad-tree with a nested multi-type tree coding block structure. An example of block partitions for one CTU (406) is shown in FIG. 4D, which illustrates an example quadtree.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

Turning now to transforms and transform blocks, multiple transform sizes (e.g., ranging from 4-point to 64-point for each dimension) and transform shapes (e.g., square or rectangular with width/height ratio's 2:1/1:2 and 4:1/1:4) may be utilized. Notably, while the encoder component applies transforms, the decoder component performs the inverse transforms. Thus, in the description below, transforms described in the context of the decoder component may be the inverse of the transforms applied on the encoder side.

A two-dimensional transform process may involve the use of hybrid transform kernels (e.g., composed of different one-dimensional transforms for each dimension of the coded residual block). Primary one-dimensional transforms may include at least one of a) 4-point, 8-point, 16-point, 32-point, 64-point discrete cosine transform DCT-2; b) 4-point, 8-point, 16-point asymmetric discrete sine transforms (DST-4, DST-7) and their flipped versions; or c) 4-point, 8-point, 16-point, 32-point identity transforms. The basis functions for the DCT-2 and asymmetric DSTs, such as used in AV1, are listed in Table 1.

TABLE 1

Example Primary Transform Basis Functions

| Transform Type | Basis function $T_i(j)$, i, j = 0, 1, ... , N − 1 |
|---|---|
| DCT-2 | $T_i(j) = \omega_0 \cdot \sqrt{\dfrac{2}{n}} \cdot \cos\left(\dfrac{\pi \cdot i \cdot (2j+1)}{2N}\right)$ |
| | where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{n}} \cdot \sin\left(\dfrac{\pi \cdot (2i+1) \cdot (2j+1)}{4N}\right)$ |

TABLE 1-continued

| Example Primary Transform Basis Functions | |
|---|---|
| Transform Type | Basis function $T_i(j)$, i, j = 0, 1, ... , N − 1 |
| DST-7 | $T_i(j) = \sqrt{\dfrac{4}{2N+1}} \cdot \sin\left(\dfrac{\pi \cdot (2i+1) \cdot (j+1)}{2N+1}\right)$ |
| IDTX | $T_i(j) = (i == j)?\ 1{:}0$ |

The availability of hybrid transform kernels may be based on the transform block size and prediction mode. Example dependencies are listed in Table 2 below, where "→" and "↓" denote the horizontal and vertical dimensions, and "✓" and "x" denote the availability of a kernel for that block size and prediction mode. IDTX (or IDT) stands for identity transform.

TABLE 2

Availability of Hybrid Transform Kernels

| Transform Types | Description | Prediction mode | |
|---|---|---|---|
| | | Intra | Inter |
| DCT_DCT | DCT ↓ and → | ✓ (all block sizes) | ✓ (all block sizes) |
| ADST_DCT | ADST ↓; DCT → | ✓ | ✓ |
| DCT_ADST | DCT ↓; ADST → | (block size ≤ | (block size ≤ |
| ADST_ADST | ADST ↓ and → | 16 × 16) | 16 × 16) |
| FLIPADST_DCT | FLIPADST ↓; DCT → | x | ✓ |
| DCT_FLIPADST | DCT ↓; FLIPADST → | | (block size ≤ |
| FLIPADST_FLIPADST | FLIPADST ↓ and → | | 16 × 16) |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16 × 16) | ✓ (block size ≤ 32 × 32) |
| V_DCT | DCT ↓; IDTX → | ✓ | ✓ |
| H_DCT | IDTX ↓; DCT → | (block size < 16 × 16) | (block size ≤ 16 × 16) |
| V_ADST | ADST ↓; IDTX → | x | ✓ |
| H_ADST | IDTX ↓; ADST → | | (block size < 16 × 16) |
| V_FLIPADST | FLIPADST ↓; IDTX → | x | ✓ |
| H_FLIPADST | IDTX ↓; FLIPADST → | | (block size < 16 × 16) |

For a chroma component, the transform type selection may be performed in an implicit way. For intra prediction residuals, the transform type may be selected according to the intra prediction mode, as specified in Table 3 for example. For inter prediction residuals, the transform type may be selected according to the transform type selection of the co-located luma block. Therefore, for chroma component, no transform type signaling in the bitstream may be needed.

TABLE 3

Transform Type Selection for Chroma Intra Prediction Residuals

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |

TABLE 3-continued

Transform Type Selection for Chroma Intra Prediction Residuals

| Intra prediction | Vertical Transform | Horizontal Transform |
|---|---|---|
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

Figure 5A:
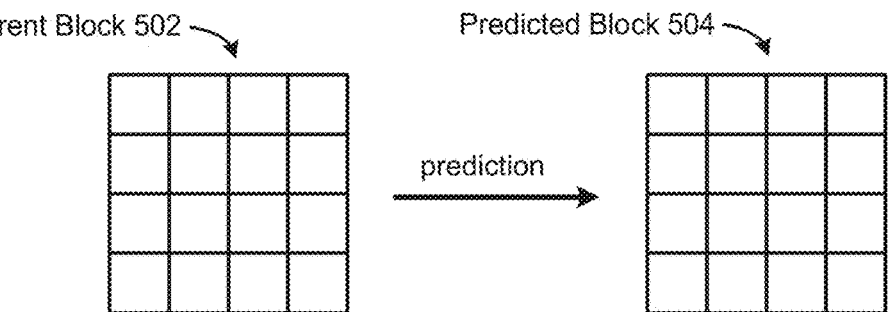
FIGS. 5A-5C illustrate example prediction blocks, residual blocks, and reconstructed blocks according to some embodiments.
Figure 5B:
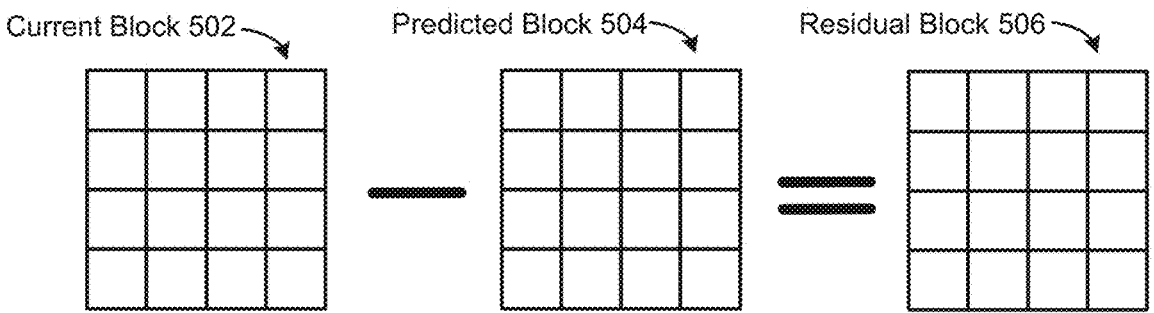
Figure 5C:
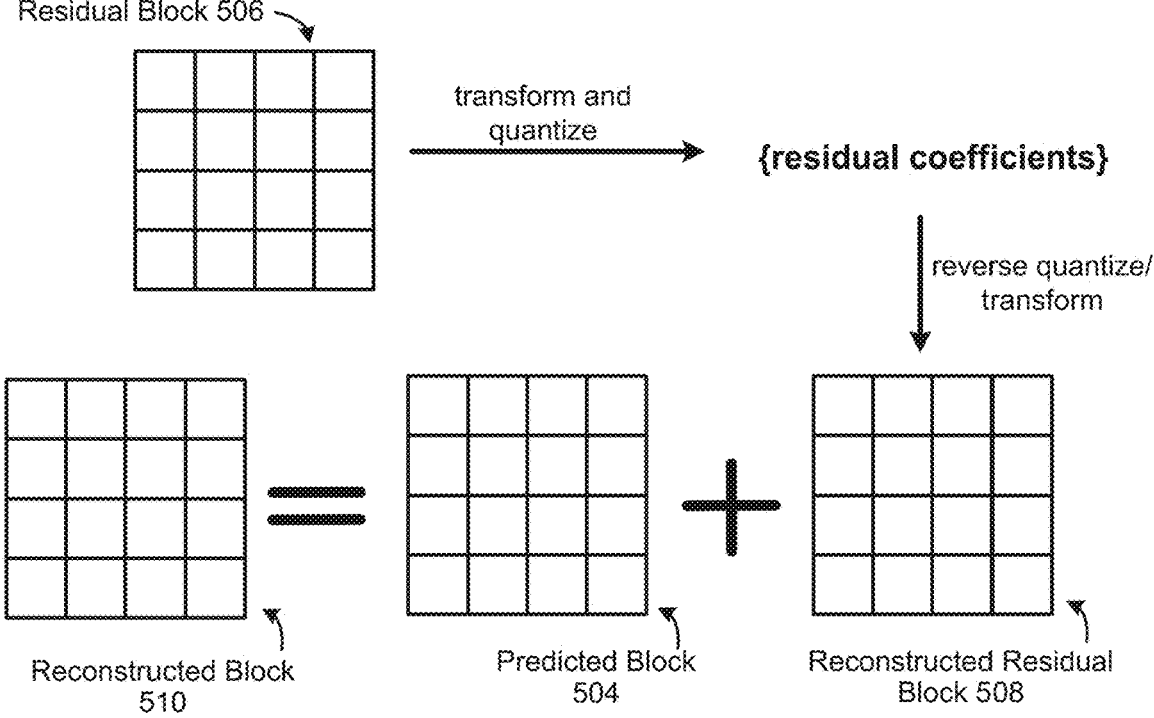

Turning now to example encoding and decoding using prediction and residual blocks. FIG. 5A illustrates the computation of a prediction block in accordance with some embodiments. In the example of FIG. 5A, an intra prediction is performed on a current block 502 to generate a predicted block 504. In some embodiments, an inter prediction is performed to generate the predicted block. The current block 502 includes a set of samples (e.g., pixel blocks) and the prediction block 504 includes a set of predictions that correspond to the set of samples. FIG. 5B illustrates the computation of a residual block in accordance with some embodiments. As shown in FIG. 5B, the prediction block 504 is subtracted from the current block 502 to generate a residual block 506 that includes a set of residues. For example, respective differences are calculated between each sample and the corresponding prediction. FIG. 5C illustrates the computation of a reconstructed block in accordance with some embodiments. As shown in FIG. 5C, the residual block 506 undergoes one or more transformations and quantization to generate a set of residual coefficients. The set of residual coefficients may be transmitted from an encoder component to a decoder component. The set of residual coefficients undergo a reverse quantization and reverse transformation to generate a reconstructed residual block 508. The reconstructed residual block 508 is combined with the predicted block 504 (e.g., reconstructed residues of the reconstructed residual block 508 are added to predictions of the prediction block 504) to generate a reconstructed block 510 corresponding to the current block 502.

In some embodiments, separable transforms, such as those shown in Table 1, are applied on intra residual and inter residual samples. In some embodiments, an intra secondary transform (IST) scheme is customized for a video coding library (e.g., used for transforming intra residual blocks). The IST scheme can efficiently capture directional patterns in intra residual samples with lower complexity compared to non-separable primary transforms. In an IST scheme the nominal intra prediction angles can be used to categorize the IST kernels.

Intra residual samples can present arbitrary directed texture patterns that can be more efficiently captured by non-separable transforms. However, the use of non-separable transforms for larger block sizes is limited due to complexities in their implementations. A non-separable secondary transform scheme that can capture most of the directionality, but with lower complexity due to its application on only the low frequency coefficients of the separable primary transform, can be applied to larger block sizes with less complexity.

In some embodiments, the IST scheme is incorporated on top of an intra prediction scheme. The IST scheme can include 12 sets of secondary transforms, with 3 kernels in each set. Table 4 shows an example secondary transform set selection and the corresponding indices used for transform set selection. The left column indicates the intra prediction modes with available transform kernels and the right column row indicates the set index. For example, at the encoder, for each mode, the best kernel from the set is selected based on RDO and signaled (4 symbols, including no IST). In this example, at the decoder, the bitstream is parsed to get the kernel used.

TABLE 4

| Secondary transform set selection | |
|---|---|
| Intra prediction | Set index |
| DC_PRED | 0 |
| V_PRED | 1 |
| H_PRED | 2 |
| D45_PRED | 3 |
| D135_PRED | 4 |
| D113_PRED | 5 |
| D157_PRED | 6 |
| D203_PRED | 7 |
| D67_PRED | 8 |
| SMOOTH_PRED | 9 |
| SMOOTH_V_PRED | 10 |
| SMOOTH_H_PRED | 11 |

In some embodiments, the secondary transform set is derived based on the intra prediction directions and the kernel type within a set is explicitly signaled. In some embodiments, the IST is enabled when either DCT-2 or ADST is used as both the horizontal and vertical primary transforms. In some embodiments, the IST is enabled only for luma intra blocks. For example, according to the block size, a 4×4 non-separable transform or 8×8 non-separable transform can be selected. If min (tx_width, tx_height)<8 the 4×4 IST can be selected. For larger blocks with both tx_width and tx_height being greater than or equal to 8, 8×8 IST can be used. Here tx_width and tx_height correspond to the transform block width and height respectively. The input to the IST may be low frequency primary transform coefficients in a zig-zag scan order, which may be the default scan order. This helps to achieve more efficient decorrelation of neighboring low frequency coefficients.

In some embodiments, both intra and inter coded blocks can be further partitioned into multiple transform units (e.g., with a partitioning depth up to 2 levels). In some embodiments, application of IST is limited to the root (depth 0) of the transform partitioning tree structure. A decrease in the overall encoding time complexity (~50%) with minimal impact in compression efficiency (~0.25% loss) may be achieved by this limitation. In some embodiments using the IST scheme, a square transform block size is utilized to derive the context information, and thereby the contexts, to be used for entropy coding the kernel index. For rectangular transform blocks, the next smallest square size may be utilized.

In some embodiments, a IST scheme defines 14 sets of secondary transforms, with 3 kernels in each set. The IST set selection may depend on the intra prediction mode employed for residual generation. Table 5 below describes the mapping between intra prediction modes, a primary transform type, and an IST set index. The first column indicates the intra prediction modes with available kernels, the second indicates primary transform type and the third indicates the set index. According to the block size, a 16-point or 64-point IST may be selected. If min(tx_width, tx_height)<8, the 16-point IST can be selected. For larger blocks with both tx_width and tx_height being greater than or equal to 8, the 64-point IST may be used. Here tx_width and tx_height correspond to transform block width and height respectively. The transform coefficients outside the region of application (RoA) of IST (primary only transform coefficients) may be zeroed out.

TABLE 5

| Secondary transform set selection | | |
|---|---|---|
| Intra nominal mode | Primary transform type | IST set index |
| DC_PRED | DCT Only | 0 |
| V_PRED | | 1 |
| H_PRED | | 1 |
| D45_PRED | | 2 |
| D135_PRED | | 3 |
| D113_PRED | | 4 |
| D157_PRED | | 4 |
| D203_PRED | | 5 |
| D67_PRED | | 5 |
| SMOOTH | | 6 |
| SMOOTH_V | | 1 |
| SMOOTH_H | | 1 |
| DC_PRED | ADST only | 7 |
| V_PRED | | 8 |
| H_PRED | | 8 |
| D45_PRED | | 9 |
| D135_PRED | | 10 |
| D113_PRED | | 11 |
| D157_PRED | | 11 |
| D203_PRED | | 12 |
| D67_PRED | | 12 |
| SMOOTH | | 13 |
| SMOOTH_V | | 8 |
| SMOOTH_H | | 8 |

Table 5 shows that the 14 secondary transform sets are dependent on two primary transform types, DCT_DCT and ADST_ADST. Hence, only 7 different sets need be signaled for one primary transform type. In some embodiments, the probabilistic context selected for each set is derived from the intra prediction modes. In some embodiments, an encoder component chooses the IST set implicitly based on a pre-defined mapping between intra prediction modes and IST sets. In some embodiments, the encoder performs an additional search on all the available IST sets (e.g., instead of checking only one IST set depending on the intra prediction mode), so that the encoder can make rate-distortion optimized decisions on the selection of IST set.

In some embodiments, the IST is enabled for inter coded blocks. For example, the IST kernels that are used for intra coded blocks are also applied to inter coded blocks. In some embodiments, the IST kernels that are used for intra coded blocks are reused for inter coded blocks with no changes or additions. In some embodiments, the above description on IST for intra coded blocks is also applicable to inter coded blocks. For example, the encoder can select from multiple sets and multiple kernels within a set (e.g., 7 sets and 3 kernels within a set). The kernel and set index may be explicitly signaled.

In some embodiments, IST is enabled for inter coded blocks using DCT_DCT or ADST_ADST as primary transform. For example, only the kernel index is signaled for inter blocks and the set used corresponds to DC_PRED or set index 0.

FIG. 7A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream that includes a set of inter mode encoded blocks and a corresponding set of transform coefficients. The system derives (604) a set of inter mode residual blocks from the set of transform coefficients. The system determines (606), according to a value of a first indicator (e.g., a flag) in the video bitstream, whether one or more non-separable transform kernels are to be applied to the set of inter mode residual blocks. When the first indicator has a first value, the system applies (608) a first non-separable transform kernel to the set of inter mode residual blocks. When the indicator has a second value, the system forgoes (610) applying the first non-separable transform kernels to the set of inter mode residual blocks. The system reconstructs (612) a set of video blocks using the set of inter mode residual blocks and a corresponding set of prediction blocks. For example, a flag may be received in a coded bitstream, where the flag is associated with the application of non-separable transform kernels on inter prediction residual blocks. In some embodiments, the flag is binary and indicates whether non-separable transform kernels are applied on inter mode residual blocks.

In some embodiments, the flag is signaled in high-level syntax (e.g., sequence-level flag, picture-level flag, subpicture-level flag, slice-level flag, tile-level flag) or block-level syntax (e.g., largest coding block level flag, largest coding block row level flag, coding block level flag, or transform block level flag).

In some embodiments, the flag can take N values, where N is an integer. For example, when the value of the flag is equal to a first value, non-separable transform kernels are not applied on inter prediction residual blocks. Otherwise, non-separable transform is applied on inter mode residual blocks and the non-separable transform kernel is determined by a kernel index specified the received flag value.

In some embodiments, when the flag value corresponds to a kernel index, a set index flag is further signaled. The set index flag can take M values, where M is an integer. In one example, M may be the number of intra prediction modes. In another example, M may be the same number of non-separable transform (either primary or secondary) sets that are applicable to intra coded blocks. In some embodiments, M is less than (or greater than) the number of non-separable transform (either primary or secondary) sets that are applicable to intra coded blocks.

In some embodiments, the set index is binarized and coded using binary symbols. In some embodiments, the flag is binarized and coded using a binary codeword. In some embodiments, one of the binary symbols in the binarized codeword specifies whether non-separable transform kernels are applied on inter prediction residual blocks or not.

In some embodiments, when the flag value corresponds to a kernel index, a set index is derived from the predicted samples of the inter coded block. In some embodiments, all the predicted samples or a subset of them are used for the set index derivation.

In some embodiments, the method for set index derivation includes statistical analysis of spatial directional patterns in the predicted samples. For example, the method may include simple techniques like edge detection and classification, gradient analysis, and/or more complex techniques like Histogram of Oriented Gradients (HOG), or neural network-based analysis.

In some embodiments, corner samples (as shown in shaded area in FIG. 6) of the prediction block are used to analyze the gradient in both dimensions (nominally dx, dy), where the inverse tangent of dy/dx is mapped to a set index. In some embodiments, boundary samples (e.g., samples located at the top/bottom/left/right boundary) of the prediction block are used to analyze the gradient in both dimensions (nominally dx, dy), where the inverse tangent of dy/dx is mapped to a set index.

In some embodiments, edge detection can be implemented by performing a multiple filtering operations on the samples and the output, and the outputs of these filtering operations are used to determine an edge direction. Alternatively, known edge detection methods, including but not limited to Canny edge detection, can be applied.

In some embodiments, the prediction modes of the neighboring blocks are used to derive the kernel index or set index of non-separable transform kernel. In some embodiments, the prediction mode includes the intra/inter prediction mode, intra prediction angle, and/or split angle of the geometric partitioning.

In some embodiments, when the flag value corresponds to a kernel index, a default set index is used. In some embodiments, the flag is signaled in block-level syntax (e.g., the largest coding block level flag, the largest coding block row level flag, a coding bloc level flag, a transform block level flag).

In some embodiments, the non-separable transform kernels (or non-separable transform kernel sets) used on the intra coded blocks and inter coded blocks can overlap each other. For example, some non-separable transform kernels used on the intra coded blocks are also applicable on the inter coded blocks, and some non-separable transform kernels used on the intra (or inter) coded blocks are also applicable on the inter (or intra) coded blocks.

In some embodiments, the non-separable transform kernels (or non-separable transform kernel sets) used on the inter coded blocks is the subset of the non-separable transform kernels (or non-separable transform kernel sets) used on the intra mode coded blocks.

In some embodiments, whether the same non-separable transform kernels used in intra coded block are used inter mode coded block depends on the inter prediction mode (and/or other coded information).

FIG. 7B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data that includes a set of video blocks. The system derives (654) a set of inter mode residual blocks from the set of video blocks. The system determines (656) whether one or more non-separable transform kernels are to be applied to the set of inter mode residual blocks. The system generates (658) a set of transform coefficients from the set of inter mode residual blocks in accordance with the determination as to whether the one or more non-separable transform kernels are to be applied to the set of inter mode residual blocks. The system determines (660) a value for a first indicator according to whether the one or more non-separable transform kernels are to be applied to the set of inter mode residual blocks. The system signals (662) the first indicator in a video bitstream. The system signals (664) the set of transform coefficients in the video bitstream. As described previously, the encoding process may mirror the decoding processes described herein (e.g., performing non-separable transforms). For brevity, those details are not repeated here.

Although FIGS. 7A and 7B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments:

(A1) In one aspect, some embodiments include a method (e.g., the method 600) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream that includes a set of inter mode encoded blocks and a corresponding set of transform coefficients; (ii) deriving a set of inter mode residual blocks from the set of transform coefficients; (iii) determining, according to a value of a first indicator in the video bitstream, whether one or more non-separable transform kernels are to be applied to the set of inter mode residual blocks; (iv) when the indicator has a first value, applying a first non-separable transform kernel to the set of inter mode residual blocks; (v) when the indicator has a second value, forgoing applying the first non-separable transform kernels to the set of inter mode residual blocks; and (vi) reconstructing a set of video blocks using the set of inter mode residual blocks and a corresponding set of prediction blocks. For example, one or multiple flags in the coded bitstream may be received, where each flag is associated with the application of non-separable transform kernels on inter prediction residual blocks. Any of the sets described above may include one or more constituents. In some embodiments, the first non-separable transform kernel is applied to the set of residual blocks in accordance with a determination that the indicator has a first value, and the first non-separable transform kernel is not applied to the set of residual blocks in accordance with a determination that the indicator has a second value.

(A2) In some embodiments of A1, the first indicator is encoded in the video bitstream using a binary encoding. The method includes identifying a value of the first indicator via a binarized decoding of the first indicator. As an example, the first indicator (e.g., flag) may be binarized and coded using binary codeword.

(A3) In some embodiments of A2, the first indicator comprises a binarized codeword, and a binary symbol of the binarized codeword indicates whether any non-separable transform kernels are to be applied to the set of inter mode residual blocks. For example, one of the binary symbols in the binarized codeword specifies whether non-separable transform kernels are applied on inter prediction residual blocks or not.

(A4) In some embodiments of any of A1-A3, the first indicator has a value selected from a set of N values, N being a positive integer. The method includes identifying a non-separable transform kernel from a set of non-separable transform kernels using the value of the first indicator. For example, the flag can take N values. When the value of the flag is equal to a first value, non-separable transform kernels are not applied on inter prediction residual blocks. Otherwise, non-separable transform is applied on inter mode residual blocks and the non-separable transform kernel is determined by a kernel index specified the received flag value. For example, the set index may be binarized and coded using binary symbols.

(A5) In some embodiments of A4, the method includes identifying the set of non-separable transform kernels from a plurality of sets of non-separable transform kernels based on one or more predicted samples for the set of video blocks. As an example, when the flag value corresponds to a kernel index, a set index is derived from the predicted samples of the inter coded block. For example, all the predicted samples or a subset of them are used for the set index derivation.

Figure 6:
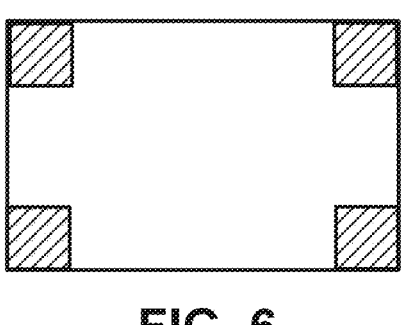
FIG. 6 illustrates a prediction block with corner samples in accordance with some embodiments.

(A6) In some embodiments of A5, the one or more prediction samples comprise corner samples from the corresponding set of prediction blocks. For example, corner samples of the prediction block (as shown in FIG. 6) are used to analyze the gradient in both dimensions (nominally dx, dy), where the inverse tangent of dy/dx is mapped to a set index.

(A7) In some embodiments of A5 or A6, the one or more prediction samples comprise boundary samples from the corresponding set of prediction blocks. For example, boundary samples (e.g., samples located at the top/bottom/left/right boundary) of the prediction block are used to analyze the gradient in both dimensions (nominally dx, dy), where the inverse tangent of dy/dx is mapped to a set index.

(A8) In some embodiments of any of A5-A7, identifying the set of non-separable transform kernels based on one or more predicted samples comprises identifying the set of non-separable transform kernels using a statistical analysis of spatial directional patterns in the one or more predicted samples. For example, the method for set index derivation includes statistical analysis of spatial directional patterns in the predicted samples. As an example, such method may include edge detection and classification, gradient analysis, and/or more complex techniques such as Histogram of Oriented Gradients (HOG), or neural network-based analysis.

(A9) In some embodiments of A8, the statistical analysis includes applying an edge detection technique. For example, edge detection can be implemented by performing a multiple filtering operations on the samples and the output, and the outputs of these filtering operations are used to determine an edge direction. Alternatively, known edge detection methods, including but not limited to Canny edge detection, can be applied.

(A10) In some embodiments of any of A5-A9, the set of non-separable transform kernels is identified based on prediction mode information from neighboring blocks for the set of video blocks. As an example, the prediction modes of the neighboring blocks can be used to derive the kernel index or set index of non-separable transform kernel. For example, the prediction mode information may include an intra/inter prediction mode, an intra prediction angle, and/or a split angle of the geometric partitioning.

(A11) In some embodiments of any of A4-A10, the method includes identifying, according to a value of a second indicator in the video bitstream, the set of non-separable transform kernels from a plurality of sets of non-separable transform kernels, wherein the second indicator has a value selected from a set of M values, M being a positive integer. For example, when the first indicator (e.g., flag value) corresponds to a kernel index, a set index flag is further signaled. The set index flag can take M values.

(A12) In some embodiments of A11, M is based on a number of intra prediction modes for the video bitstream. For example, M can be but not limited to the number of intra prediction modes.

(A13) In some embodiments of A11 or A12, M is based on a number of non-separable transform sets applicable to intra mode coded blocks. For example, M can be but not limited to the same number of non-separable transform (either primary or secondary) sets that are applicable to intra coded blocks.

(A14) In some embodiments of A13, M is less than the number of non-separable transform sets applicable to intra mode coded blocks. For example, M can be less than (or greater than) the number of non-separable transform (either primary or secondary) sets that are applicable to intra coded blocks.

(A15) In some embodiments of any of A4-A14, the method includes identifying the set of non-separable transform kernels from a plurality of sets of non-separable transform kernels in accordance with a default set index. For example, when the flag value corresponds to a kernel index, a default set index is used.

(A16) In some embodiments of any of A4-A15, the set of non-separable transform kernels includes one or more non-separable transform kernels used for both inter mode residual blocks and intra mode residual blocks. For example, the non-separable transform kernels (or non-separable transform kernel sets) used on the intra coded blocks and inter coded blocks can overlap each other. That is, some non-separable transform kernels used on the intra coded blocks are also applicable on the inter coded blocks, and some non-separable transform kernels used on the intra (or inter) coded blocks are also applicable on the inter (or intra) coded blocks. In some embodiments, the non-separable transform kernels (or non-separable transform kernel sets) used on the inter coded blocks is the subset of the non-separable transform kernels (or non-separable transform kernel sets) used on the intra mode coded blocks. In some embodiments, whether the same non-separable transform kernels used for intra coded block can also be used inter mode coded block depends on the inter prediction mode (and/or other coded information).

(A17) In some embodiments of any of A1-A16, the first indicator is a binary indicator indicating whether any non-separable transform kernels are to be applied to the set of inter mode residual blocks. For example, the flag is binary, which indicates whether non-separable transform kernels are applied on inter mode residual blocks.

(A18) In some embodiments of any of A1-A17, the first indicator is signaled in a high-level syntax of the video bitstream. For example, the first indicator (e.g., the flag) may be signaled in high-level syntax (e.g., sequence-level flag, picture-level flag, subpicture-level flag, slice-level flag, tile-level flag) or block-level syntax (e.g., largest coding block level flag, largest coding block row level flag, coding bloc level flag, transform block level flag). In some embodiments, the flag is signaled in block-level syntax (e.g., the largest coding block level flag, the largest coding block row level flag, a coding bloc level flag, or a transform block level flag).

(B1) In another aspect, some embodiments include a method (e.g., the method 650) of video encoding. In some embodiments, the method is performed at a computing system having memory and one or more processors. The method includes: (i) receiving video data that includes a set of video blocks; (ii) deriving a set of inter mode residual blocks from the set of video blocks; (iii) determining whether one or more non-separable transform kernels are to be applied to the set of inter mode residual blocks; (iv) generating a set of transform coefficients from the set of inter mode residual blocks in accordance with the determination as to whether the one or more non-separable transform kernels are to be applied to the set of inter mode residual blocks; (v) determining a value for a first indicator according to whether the one or more non-separable transform kernels are to be applied to the set of inter mode residual blocks; (vi) signaling the first indicator in a video bitstream; and (vii) signaling the set of transform coefficients in the video bitstream.

(B2) In some embodiments of B1, signaling the first indicator comprises signaling a binarized codeword.

(B3) In some embodiments of B1 or B2, the method includes determining a kernel index for the one or more non-separable transform kernels, and assigning the value for the first indicator based on the kernel index.

(B4) In some embodiments of any of B1-B3, the method includes determining a value for a second indicator based on a set index for the set of transform kernels that includes the one or more non-separable transform kernels, and signaling the second indicator in the video bitstream.

(C1) In another aspect, some embodiments include a method of visual media data processing. In some embodiments, the method is performed at a computing system having memory and one or more processors. The method includes: (i) obtaining a source video sequence comprising a plurality of pictures; and (ii) performing a conversion between the source video sequence and a bitstream of visual media data, wherein the bitstream comprises: (a) a plurality of encoded blocks corresponding to the plurality of pictures; (b) a set of transform coefficients corresponding to the plurality of encoded blocks; and (c) a first indicator indicating whether one or more non-separable transform kernels are to be applied to a set of inter mode residual blocks corresponding to the set of transform coefficients.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18, B1-B4, and C1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A18, B1-B4, and C1 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream that includes a set of inter mode encoded blocks and a corresponding first set of transform coefficients and includes a set of intra mode encoded blocks and a corresponding second set of transform coefficients;

deriving a set of inter mode residual blocks from the first set of transform coefficients;

deriving a set of intra mode residual blocks from the second set of transform coefficients;

determining, according to a value of a first indicator in the video bitstream, a first set of intra secondary transform (IST) kernels that are allowed to be applied to the set of intra mode residual blocks;

determining, according to a value of a second indicator in the video bitstream, a second set of IST kernels that are allowed to be applied to the set of inter mode residual blocks, wherein the second set of IST kernels includes one or more IST kernels not in the first set of IST kernels;

identifying, according to a third indicator, an IST kernel from the second set of IST kernels:

applying the IST kernel to the set of inter mode residual blocks; and reconstructing a set of video blocks using the set of inter mode residual blocks and a corresponding set of prediction blocks.

2. The method of claim 1, wherein the first indicator is encoded in the video bitstream using a binary encoding; and the method further comprises identifying a value of the first indicator via a binarized decoding of the first indicator.

3. The method of claim 2, wherein the first indicator comprises a binarized codeword, and a binary symbol of the binarized codeword indicates whether any IST kernels are to be applied to the set of inter mode residual blocks.

4. The method of claim 1, wherein the third indicator has a value selected from a set of N values, N being a positive integer; and the method further comprises identifying the IST kernel from the second set of IST kernels using the value of the third indicator.

5. The method of claim 4, further comprising identifying the second set of IST kernels from a plurality of sets of non-separable transform kernels based on one or more predicted samples for the set of inter mode encoded blocks.

6. The method of claim 5, wherein the one or more predicted samples comprise corner samples from the corresponding set of prediction blocks.

7. The method of claim 5, wherein the one or more predicted samples comprise boundary samples from the corresponding set of prediction blocks.

8. The method of claim 5, wherein identifying the second set of IST kernels based on the one or more predicted samples comprises identifying the second set of IST kernels using a statistical analysis of spatial directional patterns in the one or more predicted samples.

9. The method of claim 8, wherein the statistical analysis includes applying an edge detection technique.

10. The method of claim 5, wherein the second set of IST kernels is identified based on prediction mode information from neighboring blocks for the set of video blocks.

11. The method of claim 4, further comprising identifying, according to a value of the first indicator in the video bitstream, the first set of IST kernels from a plurality of sets of IST kernels, wherein the first indicator has a value selected from a set of M values, M being a positive integer.

12. The method of claim 11, wherein M is based on a number of intra prediction modes for the video bitstream.

13. The method of claim 11, wherein Mis based on a number of IST sets applicable to intra mode coded blocks.

14. The method of claim 13, wherein Mis less than the number of IST sets applicable to intra mode coded blocks.

15. The method of claim 4, further comprising identifying the set of IST kernels from a plurality of sets of IST kernels in accordance with a default set index.

16. The method of claim 4, wherein the set of IST kernels includes one or more IST kernels used for both inter mode residual blocks and intra mode residual blocks.

17. The method of claim 1, wherein the second first indicator is a binary indicator indicating whether any kernels are allowed to be applied to the set of inter mode residual blocks.

18. The method of claim 1, wherein the second indicator is signaled in a high-level syntax of the video bitstream.

19. A computing system, comprising:
control circuitry;
memory; and
one or more sets of instructions stored in the memory and configured for execution by the control circuitry, the one or more sets of instructions comprising instructions for:
receiving video data that includes a set of video blocks;
deriving a set of intra mode residual blocks from the set of video blocks;
deriving a set of inter mode residual blocks from the set of video blocks;
identifying a first set of intra secondary transform (IST) kernels applicable to the set of intra mode residual blocks;
identifying a second set of IST kernels applicable to the set of inter mode residual blocks, wherein the second set of IST kernels includes one or more IST kernels not in the first set of IST kernels;
generating a first set of transform coefficients from the set of inter mode residual blocks using a first IST kernel from the second set of IST kernels;
generating a second set of transform coefficients from the set of intra mode residual blocks using a second IST kernel from the first set of IST kernels;
determining a value for a first indicator indicating that the second set of IST kernels are applicable to the set of inter mode residual blocks;
signaling the first indicator and a second indicator indicating the first IST kernel in a video bitstream; and
signaling the first set of transform coefficients and the second set of transform coefficients in the video bitstream.

20. A non-transitory computer-readable storage medium storing a video bitstream that is generated by a video encoding method, the video bitstream comprising:
coded information for a plurality of blocks of video data, including a first set of transform coefficients corresponding to a set of intra mode blocks and a second set of transform coefficients corresponding to a set of inter mode blocks;
a first indicator indicating that a first set of intra secondary transform (IST) kernels are applicable to the set of inter mode residual blocks; and
a second indicator indicating that a second set of IST kernels are applicable to the set of intra mode residual blocks, wherein the second set of IST kernels includes one or more IST kernels not in the first set of IST kernels;
wherein the video encoding method comprises:
deriving the set of intra mode residual blocks;
deriving the set of inter mode residual blocks;
identifying the first set of IST kernels applicable to the set of inter mode residual blocks;
identifying the second set of IST kernels applicable to the set of intra mode residual blocks;
generating the first set of transform coefficients from the set of inter mode residual blocks using a first IST kernel from the first set of IST kernels;
generating the second set of transform coefficients from the set of intra mode residual blocks using a second IST kernel from the second set of IST kernels;
signaling the first indicator the second indicator in the video bitstream; and
signaling the first set of transform coefficients and the second set of transform coefficients in the video bitstream.

* * * * *